US 9,164,840 B2

(12) United States Patent
Cudak et al.

(10) Patent No.: US 9,164,840 B2
(45) Date of Patent: Oct. 20, 2015

(54) MANAGING A SOLID STATE DRIVE ('SSD') IN A REDUNDANT ARRAY OF INEXPENSIVE DRIVES ('RAID')

(75) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 515 days.

(21) Appl. No.: 13/558,485

(22) Filed: Jul. 26, 2012

(65) Prior Publication Data

US 2014/0032834 A1    Jan. 30, 2014

(51) Int. Cl.
    G06F 11/10    (2006.01)
    G06F 12/02    (2006.01)

(52) U.S. Cl.
    CPC .......... G06F 11/108 (2013.01); G06F 11/1092 (2013.01); *G06F 11/1068* (2013.01); *G06F 12/0246* (2013.01); *G06F 2211/1057* (2013.01)

(58) Field of Classification Search
    USPC ................................................. 711/114, 154
    See application file for complete search history.

(56) References Cited

U.S. PATENT DOCUMENTS

| | | |
|---|---|---|
| 2009/0271657 A1 | 10/2009 | McCombs et al. |
| 2010/0306577 A1 | 12/2010 | Dreifus et al. |
| 2010/0306580 A1 | 12/2010 | McKean et al. |
| 2011/0099320 A1 | 4/2011 | Lucas et al. |
| 2011/0191654 A1 | 8/2011 | Rub |
| 2011/0202790 A1 | 8/2011 | Rambo et al. |
| 2011/0264843 A1 | 10/2011 | Haines et al. |
| 2012/0023144 A1 | 1/2012 | Rub |
| 2012/0047265 A1 | 2/2012 | Agarwala et al. |
| 2012/0072680 A1* | 3/2012 | Kimura et al. ............ 711/154 |
| 2013/0275672 A1* | 10/2013 | Bert .......................... 711/114 |

OTHER PUBLICATIONS

Disclosed Anonymously, "Method and System for Optimizing Wear Leveling At RAID Level", Ip.com Prior Art Database, Feb. 21, 2011, 4 pp., IP.com No. IPCOM000204359D.
Disclosed Anonymously, "A Method to Balance the Life Cycles of SSD Members Within RAID Arrays", IP.com Prior Art Database, Nov. 22, 2011, 4 pp., IP.com No. IPCOM000212659D.
Jeremic, et al., "The Pitfalls of Deploying Solid-State Drive RAIDs", Proceedings from Systor 2011: 4th Annual International Systems and Storage Conference, Haifa, Israel, Jun. 2011, 20 pp., Association for Computing Machinery, USA, DOI: 10.1145/1 987816.1987835.

* cited by examiner

*Primary Examiner* — Mardochee Chery
(74) *Attorney, Agent, or Firm* — Edward J. Lenart; Katherine S. Brown; Kennedy Lenart Spraggins LLP

(57) ABSTRACT

Managing a solid state drive ('SSD') in a Redundant Array of Inexpensive Drives ('RAID'), including: detecting, by a RAID engine, a number of cell failures of the SSD exceeding a predetermined threshold; responsive to detecting the number of cell failures of the SSD exceeding the predetermined threshold: redirecting, by the RAID engine, a write of data not originally stored in the RAID to a drive in the RAID other than the SSD; and redirecting, by the RAID engine, writes originally directed to data stored on the SSD to another drive in the RAID, including unmapping the data stored on the SSD.

18 Claims, 4 Drawing Sheets

MANAGING A SOLID STATE DRIVE ('SSD') IN A REDUNDANT ARRAY OF INEXPENSIVE DRIVES ('RAID')

BACKGROUND

1. Field of the Invention

The field of the invention is data processing, or, more specifically, methods, apparatus, and products for managing a solid state drive ('SSD') in a Redundant Array of Inexpensive Drives ('RAID').

2. Description of Related Art

Solid state memory devices, such as solid state drives ('SSDs') are typically configured with a predefined amount of memory space, referred to as the 'over provisioned' area, that is reserved and not accessible by a user. The over provisioned area includes spare memory cells that may be used for failover, when other memory cells outside of the over provisioned area fail. A cell may 'fail' in various ways including, for example, by being written to a predefined number of times.

A typical over provisioned area of an SSD may be configured at 28% of the total storage space for the drive. So, for example, a 256 Gigabyte (GB) SSD may include 200 GB of capacity available for access by a user with 56 GB reserved for the over provisioned area. Thus, the cells in the over provisioned area of an SSD may be used for failover of cells in the user accessible memory space up to the size of the over provisioned area. Once the capacity of failed cells in the user accessible memory space of the SSD equals the capacity of over provisioned area, any future failures of cells in the user accessible memory space reduces the available user capacity. As such, SSDs are typically configured to a read-only mode when the capacity of failed cells in the user accessible memory space is equal to the capacity of the over provisioned area. In the read-only mode, the SSD restricts all writes and allows only reads of data stored on the SSD.

Present RAID controllers, however, are not configured to address SSDs operating in read-only mode in a RAID.

SUMMARY

Methods, apparatus, and products for managing a solid state drive ('SSD') in a Redundant Array of Inexpensive Drives ('RAID') are disclosed in this specification. Managing an SSD in a RAID in accordance with embodiments of the present invention includes: detecting, by a RAID engine, a number of cell failures of the SSD exceeding a predetermined threshold; responsive to detecting the number of cell failures of the SSD exceeding the predetermined threshold: redirecting, by the RAID engine, a write of data not originally stored in the RAID to a drive in the RAID other than the SSD; and redirecting, by the RAID engine, writes originally directed to data stored on the SSD to another drive in the RAID, including unmapping the data stored on the SSD.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
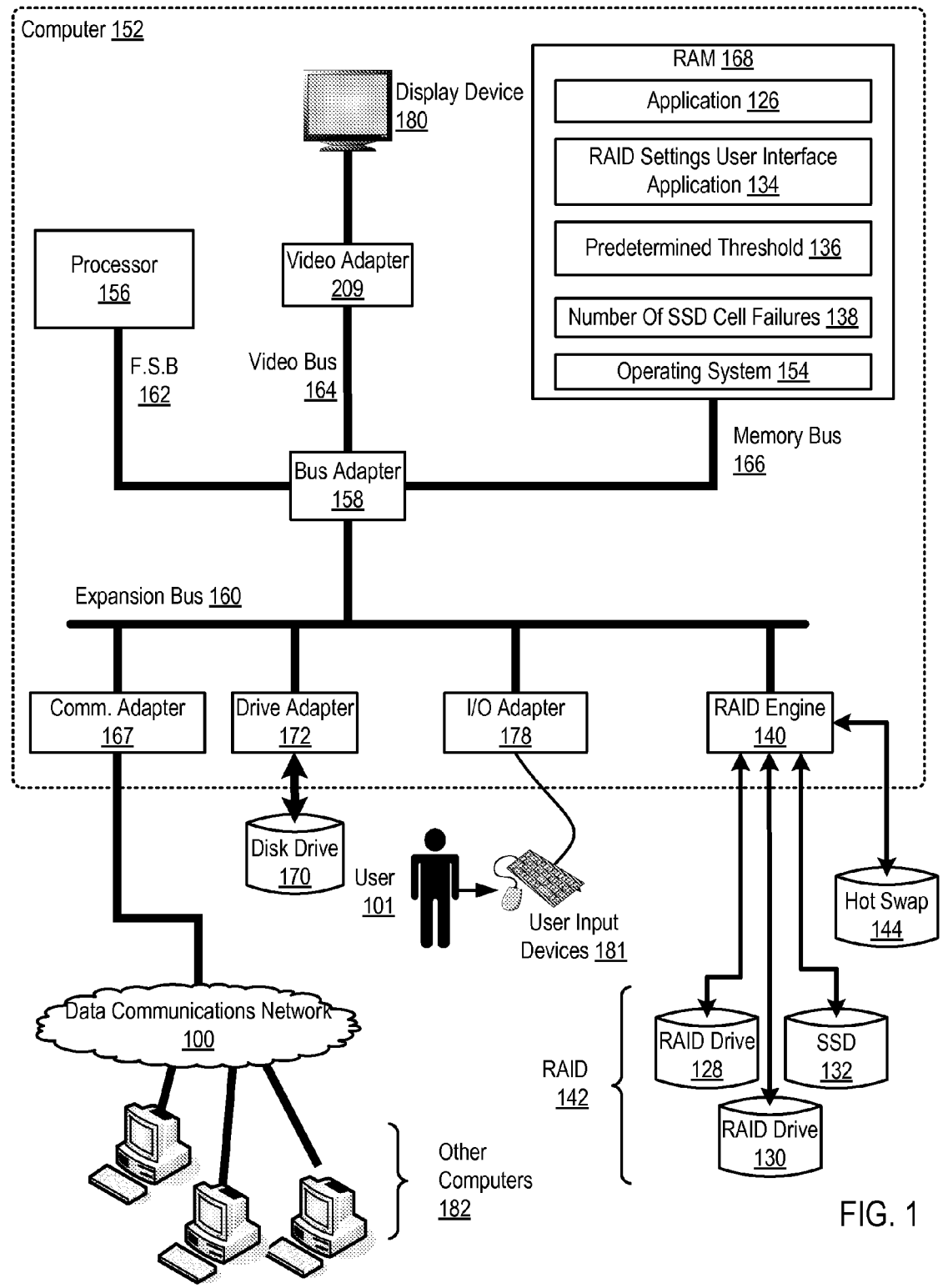
FIG. 1 sets forth a block diagram of an example system for managing an SSD in a RAID according to embodiments of the present invention.

Exemplary methods, apparatus, and products for managing an SSD in a RAID in accordance with the present invention are described with reference to the accompanying drawings, beginning with FIG. 1. FIG. 1 sets forth a block diagram of an example system for managing an SSD in a RAID according to embodiments of the present invention. The system of FIG. 1 includes automated computing machinery comprising an exemplary computer (152) useful in managing an SSD in a RAID according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application (126), a module of computer program instructions that carries out user-level data processing tasks. Examples of such applications include spreadsheet applications, word processing applications, multimedia library and playback applications, multimedia creation applications, web browsers, database management applications, and so on as will occur to readers of skill in the art.

The application (126) in the example of FIG. 1 may read from and write to data storage, such as the RAID (142). Writes to and reads from the RAID in the example of FIG. 1 is managed by the RAID engine (140). A RAID engine may be implemented as computer hardware, computer software, or an aggregation of computer hardware and software configured for managing an SSD in a RAID in accordance with embodiments of the present invention. In some embodiments, for example, the RAID engine may be implemented as type of computer, with a processor and computer memory, where the computer memory includes instructions executable by the processor to carry out management of an SSD in a RAID. In other embodiments, the RAID engine may be implemented as a module of computer program instruction in RAM (168). In other embodiment, the RAID engine may be implemented as field programmable gate array ('FPGA'), application specific integrated circuit ('ASIC'), any combination of digital logic and analog circuitry, and other hardware aggregations as will occur to readers of skill in the art, all of which may be programmed or designed to carry out management of an SSD in a RAID according to embodiments of the present invention.

The RAID (142) in the example of FIG. 1 includes three drives, a RAID drive (128), another RAID drive (130), and an SSD (132). The RAID drives (128, 130) may be hard disk drives or SSDs. The RAID may be configured in various forms including RAID 0, in which data is split evenly across two or more disks (striped) without parity information for speed. From the perspective of the application (126), the RAID, when configured in RAID 0, is a single disk drive.

The RAID engine (140) in the example of FIG. 1 manages the SSD (132) in the RAID (142) in accordance with embodiments of the present invention by detecting, by a RAID engine, a number (138) of cell failures of the SSD exceeding a predetermined threshold (136). The SSD may be configured to report cell failures to the RAID engine (140) or the RAID engine may be configured to periodically poll the SSD (132) for a number of cell failures.

In some embodiments, the predetermined threshold (136) is a number of cells is a user-configurable value. A user (101), for example, may configure various RIAD settings through a RAID settings user interface application (134). In some embodiments, a user may set the predetermined threshold (136) to be a number less than the number of cells available in an over-provisioned area of the SSD. That is, the predetermined threshold (136) may be implemented as a value less than the maximum over-provisioning threshold of the SSD. Although described here as a number of cells, readers of skill in the art will recognize that such a predetermined threshold may also be represented as a percentage of total capacity of the SSD, as a percentage of the over provisioned area, or in some other manner.

Responsive to detecting the number of cell failures of the SSD exceeding the predetermined threshold, the RAID engine (140) may then redirect a write of data not originally stored in the RAID (142) to a drive in the RAID other than the SSD and redirect writes originally directed to data stored on the SSD (132) to another drive in the RAID. That is, the RAID engine directs ensures that no 'new data' will be written to the SSD and ensures that writes to data previously stored on the SSD are directed elsewhere. In redirecting writes to data stored on the SSD, the RAID engine (140) also unmaps the data stored on the SSD. The unmapping may be carried out in the metadata (not shown here) of the SSD without an actual erase cycle being applied to the data on the SSD.

Effectively, upon the number of cell failures in the SSD exceeding the predetermined threshold the RAID engine (140) treats the SSD as isolated, but accessible for reads. In this way, the number of writes directed to the SSD is limited thereby increasing the amount of time before the SSD enters read-only mode.

The RAID engine (140) may also be configured to determine whether memory is available on other drives (128, 130) in the RAID (142) and if memory is available on the other drives, move data stored on the SSD to available memory on one or more of the other drives in the RAID. That is, in addition to limiting the number of writes directed to the SSD, the RAID engine (140) may also move data stored on the SSD to other drives in the RAID. Once all data is moved from the SSD to other drives, the drive may be removed or replaced without losing data in the RAID. In some embodiments, this movement of data from the SSD to other drives may be a user-configurable setting. That is, in some embodiments determining whether memory is available on other drives in the RAID and moving data stored on the SSD to available memory are carried out only if moving data from the SSD to other drives is enabled by a user.

The RAID engine (140), in moving data stored on the SSD to available memory on one or more of the other drives in the RAID (142), may also move the data in a number of writes, with each write issued in dependence upon other data traffic among the drives of the RAID and the RAID engine. That is, the RAID engine may move the data from the SSD to other drives while taking into account primary RAID data traffic. In this way, the RAID engine (140) effectively moves the data in the background, without affecting primary RAID performance.

Although the RAID settings user interface application (134), predetermined threshold (136) and number (138) of SSD cell failures are depicted in the example of FIG. 1 as being stored in RAM (168), readers of skill in the art will recognize that such modules may also be stored in flash memory, EEPROM or other types of memory, either in stand-alone form, or as part of the RAID engine (140) itself.

Also stored in RAM (168) is an operating system (154). Operating systems useful in systems that manage an SSD in a RAID according to embodiments of the present invention include UNIX™ Linux™ Microsoft XP™, AIX™, IBM's i5/OS™, and others as will occur to those of skill in the art. The operating system (154) and application (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that manage an SSD in a RAID according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that manage an SSD in a RAID according to embodiments of the present invention include modems for wired dial-up communications, Ethernet (IEEE 802.3) adapters for wired data communications, and 802.11 adapters for wireless data communications.

The arrangement of drives, computing components, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
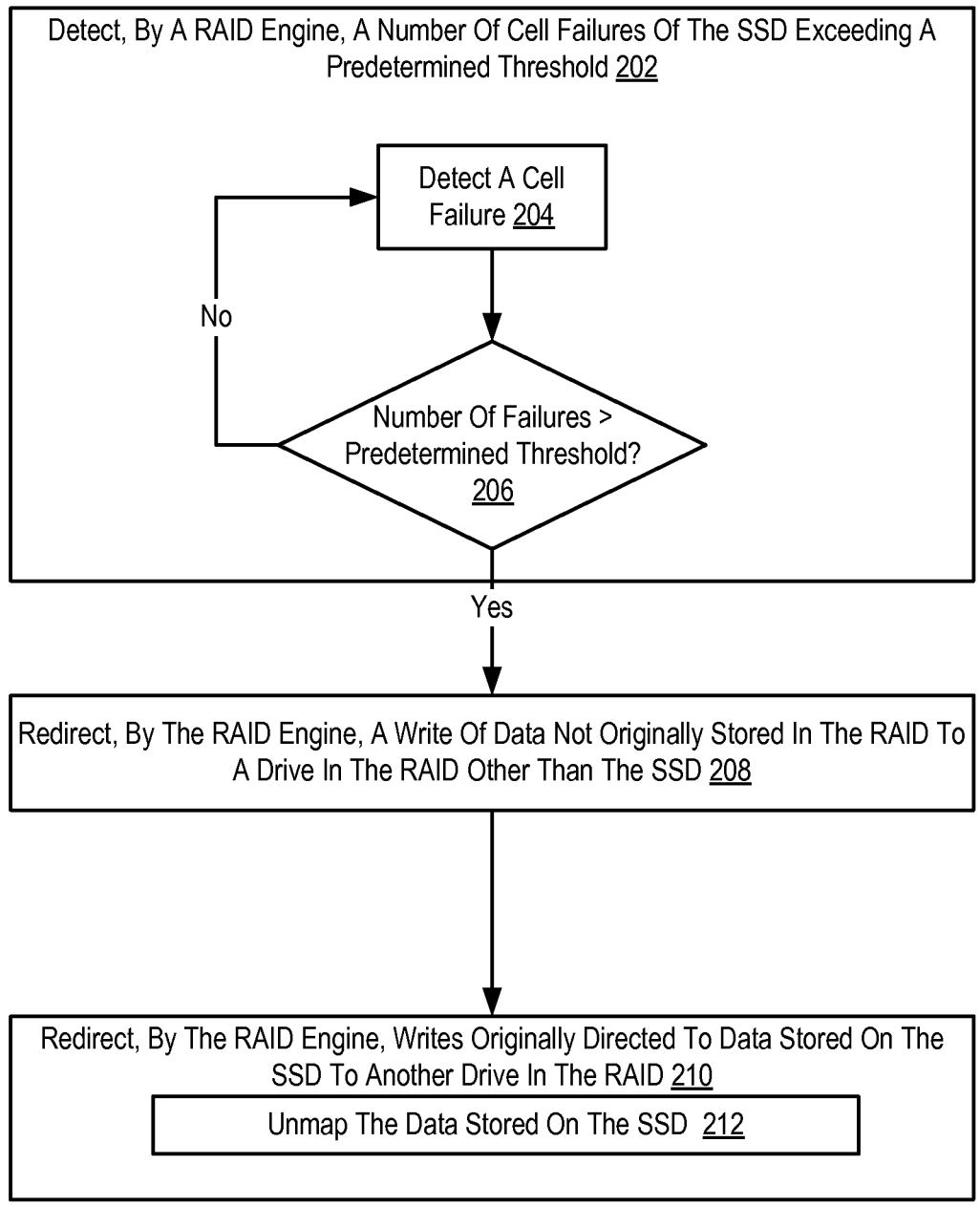
FIG. 2 sets forth a flow chart illustrating an exemplary method for managing an SSD in a RAID according to embodiments of the present invention.

For further explanation, FIG. 2 sets forth a flow chart illustrating an exemplary method for managing an SSD in a RAID according to embodiments of the present invention. The method of FIG. 2 includes detecting (202), by a RAID engine, a number of cell failures of the SSD exceeding a predetermined threshold. In the method of FIG. 2, detecting (202) a number of cell failures of the SSD exceeding a predetermined threshold may be carried out by detecting (204) a cell failure and determining (206) whether a total number of cell failures of the SSD is greater than the predetermined threshold. If the total number of cell failures of the SSD is not greater than the predetermined threshold, the RAID engine may wait until detecting (204) a subsequent cell failure. Although described in this example as detecting each cell failure, readers of skill in the art will recognize that the RAID engine may alternatively be configured to poll the SSD periodically for the total number of cell failures.

If the total number of cell failures of the SSD is greater than the predetermined threshold, the method of FIG. 2 continues by redirecting (208), by the RAID engine, a write of data not originally stored in the RAID to a drive in the RAID other than the SSD. The RAID engine may maintain a mapping of addresses received from the user-level application or operating system as a target of a previous write command to an address on the SSD. For each mapping, the RAID engine may also maintain a 'dirty bit' or the like indicating whether the address on the SSD has been erased without a future write. The RAID engine, upon receiving a write command which would otherwise be directed to the SSD, may consult the mappings to determine whether the target address on the SSD contains un-erased and previously stored data. If the address contains erased (and not re-written) data or has never been written to, the RAID engine may determine the write command to be a write of 'new' data. That is, the RAID engine determines that the write command is a write of data not originally stored on the RAID.

The method of FIG. 2 also includes redirecting (210), by the RAID engine, writes originally directed to data stored on the SSD to another drive in the RAID. Again, the RAID engine may determine, from the mappings of write command target address to SSD addresses, whether the target address of a write command is an address mapped to an SSD address and, if so, whether the SSD address contains live (non-stale) data. If the SSD address contains live data, the RAID engine determines the write command to be directed to data stored on the SSD and redirects the write to another drive in the RAID.

In the method of FIG. 2, redirecting (210) writes originally directed to data stored on the SSD to another drive in the RAID also includes unmapping the data stored on the SSD. Unmapping the data stored on the SSD may be carried out by the RAID engine issuing one or more write commands to the SSD to erase the mapping of the target address of the write command to an actual cell location on the SSD.

Figure 3:
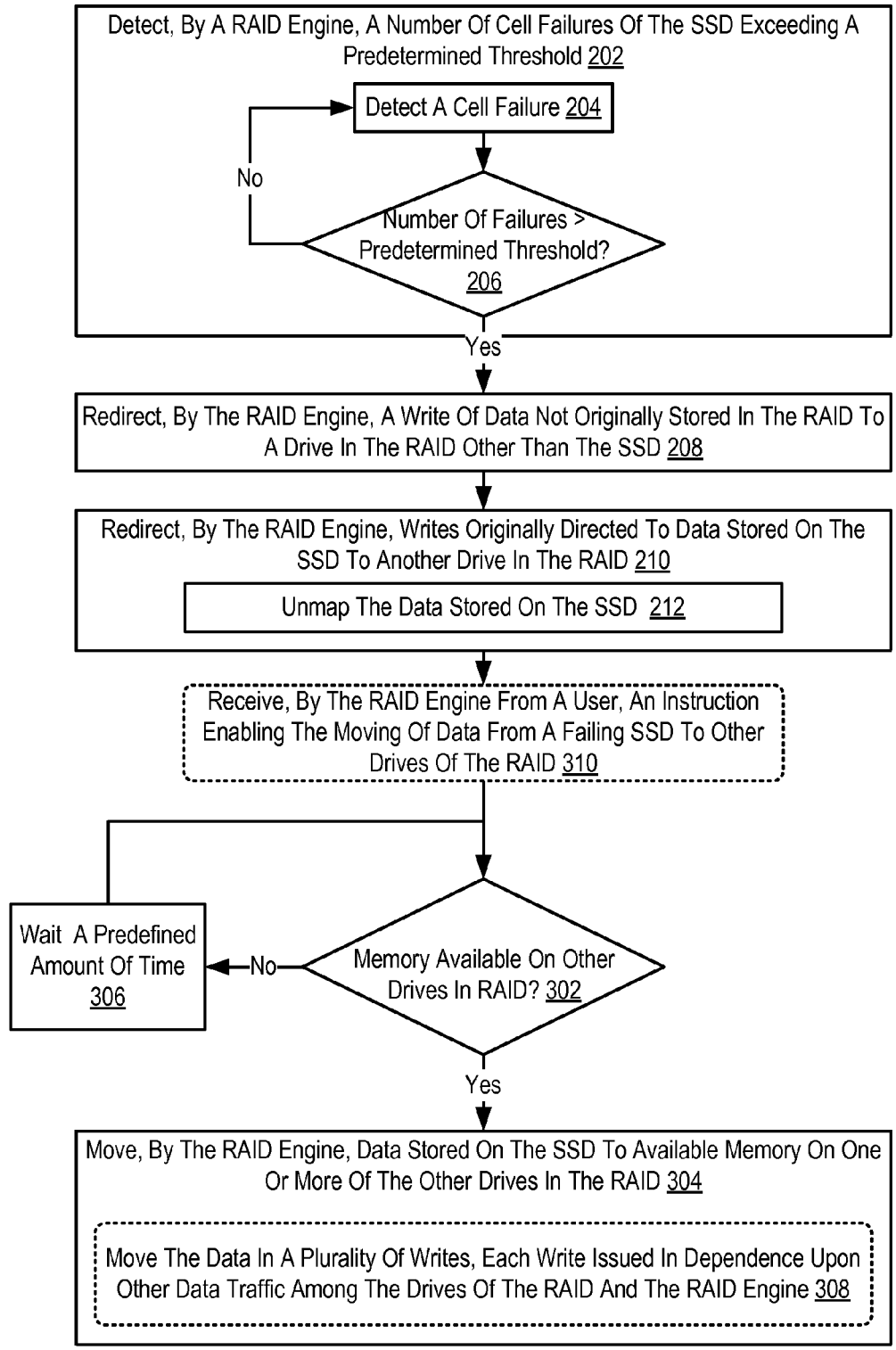
FIG. 3 sets forth a flow chart illustrating a further exemplary method for managing an SSD in a RAID according to embodiments of the present invention.

For further explanation, FIG. 3 sets forth a flow chart illustrating a further exemplary method for managing an SSD in a RAID according to embodiments of the present invention. The method of FIG. 3 is similar to the method of FIG. 2, including as it does:
  detecting (204), by a RAID engine, a number of cell failures of the SSD exceeding a predetermined threshold;
  responsive to detecting the number of cell failures of the SSD exceeding the predetermined threshold:
    redirecting (208), by the RAID engine, a write of data not originally stored in the RAID to a drive in the RAID other than the SSD; and
    redirecting (210, by the RAID engine, writes originally directed to data stored on the SSD to another drive in the RAID, including unmapping the data stored on the SSD.

The method of FIG. 3 differs from the method of FIG. 2, however, in that the method of FIG. 3 includes an optional step: receiving (310), by the RAID engine from a user, an instruction enabling the moving of data from a failing SSD to other drives in the RAID. Receiving (310) such a user instruction may be carried out in various ways including receiving the instruction through a graphical user interface ('GUI') presented to the user, where the GUI is configured to receiving user input and provide to the RAID engine various settings.

The method of FIG. 3 also includes determining (302), by the RAID engine, whether memory is available on other drives in the RAID. Determining (302) whether memory is available on other drives in the RAID may be carried out in various ways including, for example, by polling the drives in the RAID or by maintaining a indication of capacity utilization for each drive in the RAID throughout operation of the RAID.

If memory is available on other drives in the RAID, the method of FIG. 3 includes moving (304), by the RAID engine, data stored on the SSD to available memory on one or more of the other drives in the RAID. Moving (304) data stored on the SSD to available memory on one or more of the other drives in the RAID may be carried out by reading the data from the SSD, unmapping the data on the SSD, and writing the data to another drive with available memory space.

As mentioned above, the step of receiving (310) a user instruction enabling the moving of data from a failing SSD to another drive in the RAID is optional. In embodiments that implement the step, moving (304) data stored on the SSD to available memory on one or more of the other drives in the RAID may be carried out only if the such movement is enabled by the user. That is, in embodiments in which movement of data from the SSD to another drive in the RAID is a user-selectable option, a user must select the option in order for the RAID engine to move the data. In embodiments in which there is no user option, the RAID engine may move the data from the SSD drive without a user's authorization.

In the method of FIG. 3, moving (304) data stored on the SSD to available memory on one or more of the other drives in the RAID may be carried out by moving (308) the data in a plurality of writes, each write issued in dependence upon other data traffic among the drives of the RAID and the RAID engine. That is, the RAID engine may move the data without affecting primary RAID data traffic; effectively in the background.

Figure 4:
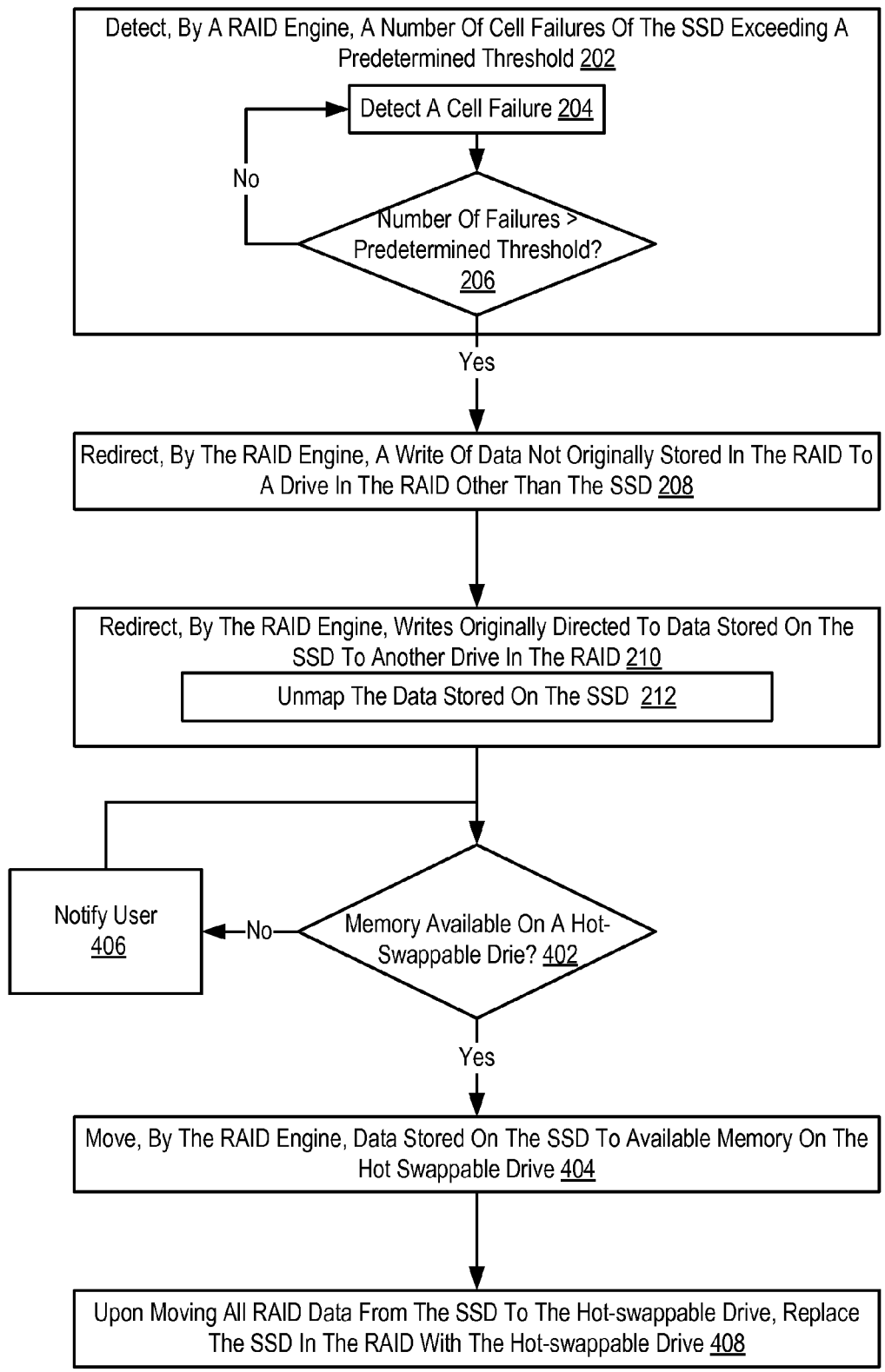
FIG. 4 sets forth a flow chart illustrating a further exemplary method for managing an SSD in a RAID according to embodiments of the present invention.

For further explanation, FIG. 4 sets forth a flow chart illustrating a further exemplary method for managing an SSD in a RAID according to embodiments of the present invention. The method of FIG. 4 is similar to the method of FIG. 2, including as it does:
  detecting (204), by a RAID engine, a number of cell failures of the SSD exceeding a predetermined threshold;
  responsive to detecting the number of cell failures of the SSD exceeding the predetermined threshold:
    redirecting (208), by the RAID engine, a write of data not originally stored in the RAID to a drive in the RAID other than the SSD; and redirecting (210, by the RAID engine, writes originally directed to data stored on the SSD to another drive in the RAID, including unmapping the data stored on the SSD.

The method of FIG. 4 differs from the method of FIG. 2, however, in that the method of FIG. 4 includes: determining (402), by the RAID engine, whether memory is available on a hot-swappable drive not currently configured in the RAID. Determining (402) whether memory is available on a hot-swappable drive not currently configured in the RAID may be carried out in various ways including, for example, by polling the hot-swappable dries in the RAID or by maintaining an indication of capacity utilization for hot-swappable drive and each drive's available to be hot-swapped into a RAID configuration.

If memory is not available on a hot-swappable drive, the RAID engine may notify (406) a user or, in the alternative, move data to another drive in the RAID as described above with respect to FIG. 3. If memory is available on a hot-swappable drive, the method of FIG. 4 includes moving (404), by the RAID engine, data stored on the SSD to available memory on the hot-swappable drive and upon moving all RAID data from the SSD to the hot-swappable drive, replacing (408) the SSD in the RAID with the hot-swappable drive. In this way, a hot-swappable drive may be utilized to replace, in real-time and without interrupting the RAID, an SSD which would otherwise enter a read-only mode. In the case of a RAID set up in a RAID 0 configuration, such hot-swapping enables the RAID to be maintained when the RAID would otherwise be considered useless having lost some or all data on the SSD.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing a solid state drive ('SSD') in a Redundant Array of Inexpensive Drives ('RAID'), the method comprising:
    detecting, by a RAID engine, a number of cell failures of the SSD exceeding a predetermined threshold, wherein the predetermined threshold comprises a value less than a maximum over-provisioning threshold of the SSD;
    responsive to detecting the number of cell failures of the SSD exceeding the predetermined threshold:
    redirecting, by the RAID engine, a write of data not originally stored in the RAID to a drive in the RAID other than the SSD; and
    redirecting, by the RAID engine, writes originally directed to data stored on the SSD to another drive in the RAID, including unmapping the data stored on the SSD.

2. The method of claim 1 wherein the predetermined threshold comprises a user-configurable value.

3. The method of claim 1 further comprising:
    determining, by the RAID engine, whether memory is available on other drives in the RAID; and
    if memory is available on other drives in the RAID, moving, by the RAID engine, data stored on the SSD to available memory on one or more of the other drives in the RAID.

4. The method of claim 3 wherein moving data stored on the SSD to available memory on one or more of the other drives in the RAID further comprises moving the data in a plurality of writes, each write issued in dependence upon other data traffic among the drives of the RAID and the RAID engine.

5. The method of claim 3 wherein determining whether memory is available on other drives in the RAID and moving data stored on the SSD to available memory on one or more of the other drives in the RAID further comprises determining whether memory is available on other drives in the RAID and moving the data stored on the SSD to available memory on one or more of the other drives in the RAID only if moving data from the SSD to other drives is enabled by a user.

6. The method of claim 1 further comprising:
    determining, by the RAID engine, whether memory is available on a hot-swappable drive not currently configured in the RAID; and
    if memory is available on the hot-swappable drive:
    moving, by the RAID engine, data stored on the SSD to available memory on the hot-swappable drive; and
    upon moving all RAID data from the SSD to the hot-swappable drive, replacing the SSD in the RAID with the hot-swappable drive.

7. An apparatus for managing a solid state drive ('SSD') in a Redundant Array of Inexpensive Drives ('RAID'), the apparatus comprising a computer processor, a computer memory operatively coupled to the computer processor, the computer memory having disposed within it computer program instructions that, when executed by the computer processor, cause the apparatus to carry out the steps of:
    detecting, by a RAID engine, a number of cell failures of the SSD exceeding a predetermined threshold, wherein the predetermined threshold comprises a value less than a maximum over-provisioning threshold of the SSD;
    responsive to detecting the number of cell failures of the SSD exceeding the predetermined threshold:
    redirecting, by the RAID engine, a write of data not originally stored in the RAID to a drive in the RAID other than the SSD; and
    redirecting, by the RAID engine, writes originally directed to data stored on the SSD to another drive in the RAID, including unmapping the data stored on the SSD.

8. The apparatus of claim 7 wherein the predetermined threshold comprises a user-configurable value.

9. The apparatus of claim 7 further comprising computer program instructions that, when executed, cause the apparatus to carry out the steps of:
    determining, by the RAID engine, whether memory is available on other drives in the RAID; and
    if memory is available on other drives in the RAID, moving, by the RAID engine, data stored on the SSD to available memory on one or more of the other drives in the RAID.

10. The apparatus of claim 9 wherein moving data stored on the SSD to available memory on one or more of the other drives in the RAID further comprises moving the data in a plurality of writes, each write issued in dependence upon other data traffic among the drives of the RAID and the RAID engine.

11. The apparatus of claim 9 wherein determining whether memory is available on other drives in the RAID and moving data stored on the SSD to available memory on one or more of the other drives in the RAID further comprises determining whether memory is available on other drives in the RAID and moving the data stored on the SSD to available memory on one or more of the other drives in the RAID only if moving data from the SSD to other drives is enabled by a user.

12. The apparatus of claim 7 further comprising computer program instructions that when executed cause the apparatus to carry out the steps of:
    determining, by the RAID engine, whether memory is available on a hot-swappable drive not currently configured in the RAID; and
    if memory is available on the hot-swappable drive:
    moving, by the RAID engine, data stored on the SSD to available memory on the hot-swappable drive; and
    upon moving all RAID data from the SSD to the hot-swappable drive, replacing the SSD in the RAID with the hot-swappable drive.

13. The apparatus of claim 7 wherein the predetermined threshold comprises a value less than a maximum over-provisioning threshold of the SSD.

14. A computer program product for managing a solid state drive ('SSD') in a Redundant Array of Inexpensive Drives ('RAID'), the computer program product disposed upon a computer readable medium, wherein the computer readable medium is not a signal, the computer program product comprising computer program instructions that, when executed, cause a computer to carry out the steps of:

detecting, by a RAID engine, a number of cell failures of the SSD exceeding a predetermined threshold, wherein the predetermined threshold comprises a value less than a maximum over-provisioning threshold of the SSD;

responsive to detecting the number of cell failures of the SSD exceeding the predetermined threshold:

redirecting, by the RAID engine, a write of data not originally stored in the RAID to a drive in the RAID other than the SSD; and redirecting, by the RAID engine, writes originally directed to data stored on the SSD to another drive in the RAID, including unmapping the data stored on the SSD.

15. The computer program product of claim 14 further comprising computer program instructions that, when executed, cause the computer to carry out the steps of:

determining, by the RAID engine, whether memory is available on other drives in the RAID; and if memory is available on other drives in the RAID, moving, by the RAID engine, data stored on the SSD to available memory on one or more of the other drives in the RAID.

16. The computer program product of claim 15 wherein moving data stored on the SSD to available memory on one or more of the other drives in the RAID further comprises moving the data in a plurality of writes, each write issued in dependence upon other data traffic among the drives of the RAID and the RAID engine.

17. The computer program product of claim 15 wherein determining whether memory is available on other drives in the RAID and moving data stored on the SSD to available memory on one or more of the other drives in the RAID further comprises determining whether memory is available on other drives in the RAID and moving the data stored on the SSD to available memory on one or more of the other drives in the RAID only if moving data from the SSD to other drives is enabled by a user.

18. The computer program product of claim 14 further comprising computer program instructions that when executed cause the computer to carry out the steps of:

determining, by the RAID engine, whether memory is available on a hot-swappable drive not currently configured in the RAID; and if memory is available on the hot-swappable drive:

moving, by the RAID engine, data stored on the SSD to available memory on the hot-swappable drive; and upon moving all RAID data from the SSD to the hot-swappable drive, replacing the SSD in the RAID with the hot-swappable drive.

\* \* \* \* \*